US012637105B2

(12) United States Patent
Silva et al.

(10) Patent No.: US 12,637,105 B2
(45) Date of Patent: May 26, 2026

(54) IMPLEMENTING MANOEUVRES IN AUTONOMOUS VEHICLES

(71) Applicant: Five AI Limited, Bristol (GB)

(72) Inventors: Alexandre Silva, Edinburgh (GB); Steffen Jaekel, Edinburgh (GB); Majd Hawasly, Edinburgh (GB); Alejandro Bordallo, Edinburgh (GB)

(73) Assignee: Five AI Limited, Cambridge (GB)

( * ) Notice: Subject to any disclaimer, the term of this patent is extended or adjusted under 35 U.S.C. 154(b) by 127 days.

(21) Appl. No.: 17/801,221

(22) PCT Filed: Feb. 18, 2021

(86) PCT No.: PCT/EP2021/053979
§ 371 (c)(1),
(2) Date: Aug. 19, 2022

(87) PCT Pub. No.: WO2021/165373
PCT Pub. Date: Aug. 26, 2021

(65) Prior Publication Data
US 2022/0410933 A1     Dec. 29, 2022

(30) Foreign Application Priority Data

Feb. 20, 2020    (GB) ..................................... 2002365

(51) Int. Cl.
*B60W 60/00* (2020.01)

(52) U.S. Cl.
CPC ..... *B60W 60/0013* (2020.02); *B60W 2520/10* (2013.01); *B60W 2520/105* (2013.01); *B60W 2720/10* (2013.01); *B60W 2720/106* (2013.01)

(58) Field of Classification Search
CPC ......... B60W 60/0013; B60W 2520/10; B60W 2520/105; B60W 2720/10;
(Continued)

(56) References Cited

U.S. PATENT DOCUMENTS

| | | | |
|---|---|---|---|
| 2017/0023937 A1* | 1/2017 | Loianno | G08G 5/0069 |
| 2017/0205831 A1* | 7/2017 | Shin | B60T 8/58 |

(Continued)

FOREIGN PATENT DOCUMENTS

| | | |
|---|---|---|
| EP | 2996003 A1 | 3/2016 |
| EP | 3147169 A2 | 3/2017 |

OTHER PUBLICATIONS

Elert, Glenn. "Kinematics and Calculus." The Physics Hypertextbook. Wayback Machine archived page from Jan. 8, 2020. URL: https://web.archive.org/web/20200108142918/https://physics.info/kinematics-calculus/. (Year: 2020).*

(Continued)

*Primary Examiner* — Hunter B Lonsberry
*Assistant Examiner* — Henry R Hinton
(74) *Attorney, Agent, or Firm* — Andrew J. Tibbetts; Samuel S. Stone; Greenberg Traurig, LLP

(57) ABSTRACT

A position target for a planned speed change maneuver is received. From a predetermined family of kinematic functions, a kinematic function for carrying out the planned speed change maneuver, is determined. The kinematic function is a first or higher order derivative of acceleration with respect to time, and is computed in a constrained optimization process as substantially optimizing a cost function defined for the planned speed change maneuver, subject to a set of hard constraints.

19 Claims, 8 Drawing Sheets

(58) Field of Classification Search
CPC ... B60W 2720/106; B60W 2554/4041; B60W
30/143; B60W 60/0027; B60W
2554/4042; B60W 2720/103; B60W
60/0011; G05D 1/0223
See application file for complete search history.

(56) References Cited

U.S. PATENT DOCUMENTS

| | | | |
|---|---|---|---|
| 2017/0210358 A1* | 7/2017 | Blumentritt | B60T 13/746 |
| 2017/0277192 A1* | 9/2017 | Gupta | B60W 30/20 |
| 2018/0164822 A1* | 6/2018 | Chu | G05D 1/0217 |
| 2018/0229368 A1* | 8/2018 | Leitner | B25J 9/1602 |
| 2021/0061282 A1* | 3/2021 | Jafari Tafti | G05D 1/0088 |
| 2021/0114617 A1* | 4/2021 | Phillips | G01C 21/3453 |
| 2021/0149396 A1* | 5/2021 | Brickwedde | G05D 1/0214 |
| 2022/0348198 A1* | 11/2022 | Kamoshita | B60W 50/0097 |
| 2023/0018073 A1* | 1/2023 | Bordelais | B60W 50/0097 |

OTHER PUBLICATIONS

Constant Jerk Equations for a Trajectory Generator. Unattributed Author . . . Available on Wayback Machine on Sep. 10, 2016. URL: https://web.archive.org/web/20160910115312/https://www.et.byu.edu/~ered/ME537/Notes/Ch5.pdf (Year: 2016).*

Erkorkmaz et al., "High speed CNC system design. Part I: jerk limited trajectory generation and quintic spline Interpolation," International Journal of Machine Tools & Manufacture, 2001, vol. 41, No. 9, pp. 1323-1345.

Kroger et al., "Online Trajectory Generation: Basic Concepts for Instantaneous Reactions to Unforeseen Events," IEEE Transactions on Robotics, Feb. 2010, vol. 26, No. 1, pp. 94-111.

Tajima et al., "Global tool-path," smoothing for CNC machine tools with uninterrupted acceleration, International Journal of Machine Tools & Manufacture, 2017, vol. 121, pp. 81-95.

International Search Report and Written Opinion mailed Apr. 23, 2021 in corresponding International PCT Patent Application No. PCT/EP2021/053979 (12 pages).

* cited by examiner

IMPLEMENTING MANOEUVRES IN AUTONOMOUS VEHICLES

CROSS-REFERENCE TO RELATED APPLICATIONS

This application is the U.S. National Stage application, pursuant to 35 U.S.C. § 371, of PCT International Patent Application No. PCT/EP2021/053979, filed Feb. 18, 2021, designating the United States and published in English, which claims priority under 35 U.S.C. §§ 119 and 365 to Great Britain Patent Application No. 2002365.1, filed Feb. 20, 2020. The contents of each of the aforementioned applications are incorporated herein by reference in their entirety.

FIELD OF INVENTION

The present disclosure relates to autonomous vehicle technology, and in particular to the implementation of certain manoeuvres in fully or semi-autonomous vehicles.

TECHNICAL BACKGROUND

An autonomous vehicle (AV), also known as a self-driving vehicle, refers to a vehicle which has a sensor system for monitoring its external environment and a control system that is capable of making and implementing driving decisions automatically. Decisions are made based on sensory input and implemented using an actor system of the AV (e.g. which may comprise drive-by-wire steering motors, and a throttle and brake control system). This includes in particular the ability to automatically adapt the vehicle's speed and direction of travel based on inputs from the sensor system. A fully autonomous or "driverless" vehicle has sufficient decision-making capability to operate without any input from a human driver. However, the term autonomous vehicle as used herein also applies to semi-autonomous vehicles, which have more limited autonomous decision-making capability and therefore still require a degree of oversight from a human driver.

Known control systems, such as adaptive cruise control (ACC), provide a system for automatically controlling the speed of an ego vehicle. ACC acts to maintain a headway between the ego vehicle and the vehicle directly in front. More sophisticated autonomous vehicles are being developed with the aim of ultimately achieving full "level 5" autonomy.

SUMMARY

The present disclosure provides techniques for implementing speed change manoeuvres in an optimal manner.

In urban settings, an AV may be required to stop frequently. It may be required to stop at traffic lights, stop or give way signs, or roundabout entrances, for example. Stopping manoeuvres are also required in non-urban settings. More generally, slowdown maneuvers (reducing speed but not necessarily to zero) and ramp up maneuvers (increasing speed) are required in many driving contexts. The present techniques allow a planned speed change manoeuvre to be carried out safely with an emphasis on comfort for the passengers of the vehicle where possible.

A first aspect of the invention provides a computer-implemented method of determining a series of control signals for controlling an autonomous vehicle to implement a planned speed change maneuver, the method comprising:

receiving from a maneuver planner a position target for the planned speed change maneuver;

selecting, from a predetermined family of kinematic functions, a kinematic function for carrying out the planned speed change maneuver, each kinematic function being a first or higher order derivative of acceleration with respect to time; and using the selected kinematic function to determine a series of control signals for implementing the planned speed change maneuver;

wherein the kinematic function is selected in a constrained optimization process as substantially optimizing a cost function defined for the speed change maneuver, subject to a set of hard constraints that:

(i) require a final acceleration, speed and position corresponding to the selected kinematic function to satisfy, respectively, an acceleration target, a speed target and the position target, given an initial speed and acceleration of the autonomous vehicle, and (ii) impose a jerk magnitude upper limit on the selected kinematic function.

The kinematic function could be a jerk-time function (first order derivative of acceleration), "snap"-time function (second order derivative), "crackle"-time function (third order derivative), "pop"-time function (fourth order derivative) etc. Expressed in mathematical terms, the kinematic function $$k(t) = \frac{d^n}{dt^n} a(t)$$

where $n \geq 1$ is the order of the time derivative.

The term "slowdown" is used in reference to a plan to reduce the speed of the autonomous vehicle. In that context, the target distance may be referred to as a "slowdown" distance. The term "ramp up" is used herein in reference to a plan to increase the speed of the autonomous vehicle, and in that event the target distance may be referred to as a "ramp up" distance. Either way, the target distance is the distance along the road at which the target speed and acceleration would be reached if the kinematic function were to be perfectly realized.

The kinematic function is always constrained to take the above predetermined form. The constrained optimization process can be seen as a form of trajectory planning, i.e. planning a trajectory for carrying-out the planned speed change maneuver, given the initial speed and acceleration of the AV. A benefit of the invention is that is can plan high-quality trajectories (which, at the very least, are guaranteed to satisfy the hard safety and comfort constraints, i.e. (i) and (ii) respectively), efficiently in real-time, over a wide range of speed change distances (encompassing, among other things, both emergency and non-emergency slowdown scenarios).

It has been found that imposing an additional constraint on the form of the jerk-function can not only improve the efficiency of the constrained optimization (in terms of computing resources), but can also improve the quality of the planned trajectories (in comparison to an equivalent constrained optimization of the same cost function without but without the additional constraint on its form). This improvement has been observed over a wide range of target distances.

Constrained optimization can be prone to unwanted convergence to solutions that are locally but non-globally optimal, particularly when the cost function and/or the hard constraints are non-linear. This type of unwanted behaviour can be prevented in the present context by constraining the form of the jerk-time function, effectively removing the freedom the constrained optimization process might otherwise have to converge to solution that, whilst locally optimal, are far from any globally-optimal solution (and which, in the present context, typically correspond to lower-quality trajectories than globally optimal trajectories).

In embodiments, the family of kinematic functions may be defined by a set of function parameters, over which the cost function is defined, and the kinematic function may be selected by computing values of the function parameters that substantially optimize the cost function subject to the set of hard constraints.

In embodiments, the set of hard constraints may further impose at least one acceleration limit on the selected kinematic function.

For example, in one of the described embodiments, the form of the jerk-time function is constrained to have a single sustained interval of negative jerk (negative trough), followed by a period of zero jerk and subsequently by followed by a single sustained interval of positive jerk (positive peak), where the only adjustable parameters are the, duration and magnitude of the peak and the trough (which can all be set differently to each other) and the duration of the intervening period of zero jerk. Upper limits are imposed on the magnitude of the jerk in the first and third time intervals, and an upper limit on the maximum acceleration (the maximum acceleration being reached at the start of the second time interval and sustained throughout it). Although highly constrained, this has been found to be highly effective in that it consistently provides high-quality trajectories over a wide range of speed change distances. Nevertheless, it will be appreciated, in view of the teaching presented herein, that alternative embodiments of the invention can be implemented with less stringent constraints on the form of the jerk function, without losing the benefits outlined above.

The jerk function can be represented mathematically as $j(t)$, i.e. as a function of time where $j(t)$ is the instantaneous jerk at time $t$ (time $t$ can be discrete or continuous).

Given a jerk function $j(t)$, the hard safety constraints can be expressed mathematically as in one embodiment as $$a(t_{end}) = a_{target},$$

$$v(t_{end}) = v_{target},$$

$$p(t_{end}) = p_{target},$$

where $a(t)$, $v(t)$ and $d(t)$ are acceleration, speed and distance functions corresponding to the jerk function $j(t)$, $p_{target}$ is a target position, and $p(t_{end})$ is the final position at which both the speed and acceleration reach the targets $v_{target}$, $a_{target}$ (there may or may not be any explicit constraint on the time $T$ at which that occurs). This assumes the targets are point targets—for targets defined in terms or ranges, the constraints could be expressed as inequalities instead.

The target distance $p_{target}$ is the distance at which targets $v_{target}$, $a_{target}$ would be reached if the jerk function $j(t)$ were to be perfectly realized in the real world. In practice, it is unlikely that the actor system will be perfect in practice. This can, however, be accounted for straightforwardly, for example by setting a conservative target distance $p_{target}$ that accommodates the possibility of a certain amount of "overshoot".

The same principles apply to higher-order kinematic functions such as snap, crackle, pop etc.

In embodiments, the hard constraints may also impose at least one acceleration and/or speed magnitude limit on the selected kinematic function.

The family of kinematic functions may be defined by a set of function parameters, over which the cost function is defined, and the kinematic function is selected by computing values of the function parameters that substantially optimize the cost function subject to the set of hard constraints.

The common form of the kinematic functions may be such that each kinematic function may be integrated analytically with respect to time, wherein the requirement pertaining to the final acceleration, speed and position is embodied as a set of closed form final distance, speed and acceleration functions of the function parameters, and is imposed without numerically integrating the selected kinematic function.

Each kinematic function may be a jerk function, jerk being the rate of change of acceleration (i.e. first order derivative of acceleration with respect to time).

The predetermined family of jerk functions may all exhibit a first interval of sustained jerk followed by a second interval of zero jerk, followed by a third interval of sustained jerk of opposite sign to the first interval, wherein the function parameters may comprise: one or more timing parameters defining respective durations of each of the first, second and third intervals, and one or more jerk magnitude parameters defining respective magnitudes of the sustained jerk in the first and third intervals.

The set of function parameters may comprise multiple timing parameters and/or multiple jerk magnitude parameters, which may be adapted to set different durations for the first, second and third time intervals and/or different jerk magnitudes in the first and third time intervals.

The set of function parameters may consist only of the three timing parameters and the two jerk magnitude parameters.

The jerk may remain constant and non-zero throughout the first and third time intervals.

Each kinematic function in the family may be a snap function, snap being the rate of change of jerk and jerk being the rate of change of acceleration (i.e. second order derivative of acceleration with respect to time).

The predetermined family of snap functions may all exhibit a first interval of sustained snap followed by a second interval of zero snap, followed by a third interval of sustained snap of opposite sign to the first interval, followed by a fourth interval of zero snap, followed by a fifth interval of sustained snap of the same sign as the first interval, followed by a sixth interval of zero snap, followed by a seventh interval of sustained snap of opposite sign to the first interval, and the set of function parameters may comprises: one or more timing parameters defining respective durations of each of the seven intervals, and one or more snap magnitude parameters defining respective magnitudes of the snap in each of the first, third, fifth and seventh intervals.

The set of function parameters may comprise multiple timing and/or multiple jerk magnitude parameters for setting different duration and/or jerk magnitudes for the different intervals.

The cost function may embody a completion time objective, which encourages a reduction in at least one of: the overall time taken to reach the final acceleration, speed and position, the duration of each of multiple time intervals over which the kinematic function is defined.

The cost function may embody a timing cost for each of the above intervals, which encourages a reduction in the duration of that time interval.

The cost function may embody a jerk magnitude objective, which encourages a reduction in jerk magnitude.

The hard constraints may also impose a jerk magnitude lower limit on the selected kinematic function.

The at least one acceleration and/or speed magnitude limit may comprise an upper acceleration and/or speed magnitude limit and a lower acceleration and/or speed magnitude limit.

Prior to instigating the speed change maneuver, a speed change initiation process may be performed repeatedly, to determine a time at which to initiate the speed change maneuver, the time chosen so as to encourage the constrained optimization process to select a kinematic function which satisfies an optimal comfort condition to the extent possible.

For example, in the example implementation described below, a set of "comfort" constraints (which characterizes the optimal comfort condition) is used in the speed change initiation process to determine when to initiate the maneuver. The constrained optimization process is performed with a set of constraints that are less stringent than the comfort constraints, and the optimization process is therefore permitted to breach the comfort constraints to an extent;

however, the initiation of the maneuver is timed to encourage the constrained optimization process to find a solution (trajectory) that minimizes the extent to which comfort constraints are breached.

The speed change initiation process may comprise determining a preliminary speed change trajectory, by computing a preliminary kinematic function with a fixed amount of jerk until a fixed acceleration limit is reached, wherein the speed change maneuver is initiated in response to the preliminary kinematic function satisfying a predetermined initiation condition.

For example, in the described implementations, the preliminary trajectory is computed based on the comfort constraints.

The hard constraints may impose an upper limit on the time taken to reach the final position, speed and acceleration.

A second aspect of the invention provides a computer-implemented method of determining a series of control signals for controlling an autonomous vehicle to implement a planned speed change maneuver, the method comprising:

receiving from a maneuver planner a position target for the planned speed change maneuver; and computing a kinematic function for carrying out the planned speed change, the kinematic function being a first or higher order derivative of acceleration with respect to time, and being computed in a constrained optimization process as substantially optimizing a cost function defined for the planned speed change maneuver, subject to a set of hard constraints;

wherein the set of hard constraints:

(i) impose a jerk magnitude upper limit on the computed kinematic function, and (ii) require a final acceleration, speed and position to meet, respectively, an acceleration target, a speed target and the position target, wherein the constrained optimization process is performed in the domain of the kinematic function, with the final acceleration, speed and position derived from the kinematic function, given an initial speed and acceleration of the autonomous vehicle, in order to apply the hard constraints; and wherein the method further comprises determining, based on the constrained optimization process, a series of control signals for implementing the planned speed change maneuver.

That is to say, a jerk function j(t) is determined that satisfies the hard comfort constraint (i), and the final position is derived from the jerk function j(t), which also involves deriving the acceleration a(t) and speed v(t) from the jerk function j(t), in order to check that the hard safety constraint is satisfied. E.g. that $$p(t_{end}) \leq p_{max},$$

where $$a(t_{end}) = a_{target},$$

$$v(t_{end}) = v_{target}$$

(which could be similarly modified to accommodate target ranges). In the present context, a speed change manoeuvre refers to a high-level planning decision to reduce or increase the AV's speed and acceleration to substantially the target levels within the position target. Lower-level planning decisions then need to be made to determine how to carry out that manoeuvre in a way that is both comfortable and preferably "natural" from the perspective of any passenger in the vehicle. Typically, these lower-level planning decisions need to be taken in real-time. The inventors have found that planning in the jerk-time or higher order domain within a constrained optimization framework, and with hard limits on jerk magnitude (but not necessarily any limit on the duration of sustained intervals of non-zero jerk) is a highly effective mechanism for carrying out slow-down and ramp up manoeuvres in a safe and natural manner.

The present techniques are suitable for both emergency and non-emergency slowdown manoeuvres, and can be used for carrying out one or both types of slowdown manoeuvre. The method can be performed with different jerk and (where applicable) acceleration and/or speed limits. For example, as described below, the described embodiments make use of "comfort" and "slowdown" constraints with different limits.

In embodiments, the kinematic function may be defined by computed value(s) of one or more function parameters, the function parameters defining a family of kinematic functions which all have a common form, the constrained optimization process being performed over the one or more function parameters in order to compute said value(s) as substantially optimizing the cost function subject to the set of hard constraints.

The form of the kinematic function is may be constrained in the same manner as set out above in relation to the first aspect.

The final distance may be derived from the kinematic function via numerical integration with respect to time.

Alternatively, the form of the jerk-time function may be constrained such that corresponding final acceleration, velocity and distance functions are derived as closed form equations, having coefficients defined by said function parameter(s) and the current speed and acceleration of the autonomous vehicle, and the corresponding speed change distance is determined using the closed form equations.

At least one of the acceleration, speed and position targets may be a point target.

With a distance, speed and/or acceleration point target, the solution is required to meet that point(s).

Alternatively or in addition, at least one of the acceleration, speed and position targets may be a range target.

With a distance, speed and/or acceleration range as a hard constraint, the solution is required to fall within the applicable range(s) (but solutions are permitted be anywhere within it; in some cases, a cost penalty may be applied which may depend on where in the range the solution falls).

Further aspects herein provide a computer system comprising one or more computers programmed or otherwise configured to carry out any of the steps disclosed herein, and a computer program product configured to program a computer system to carry those steps.

BRIEF DESCRIPTION OF THE DRAWINGS

To assist understanding of the present disclosure and to show how embodiments of the present invention may be put into effect, reference is made by way of example to the accompanying drawings, in which.

DETAILED DESCRIPTION

Figure 4:
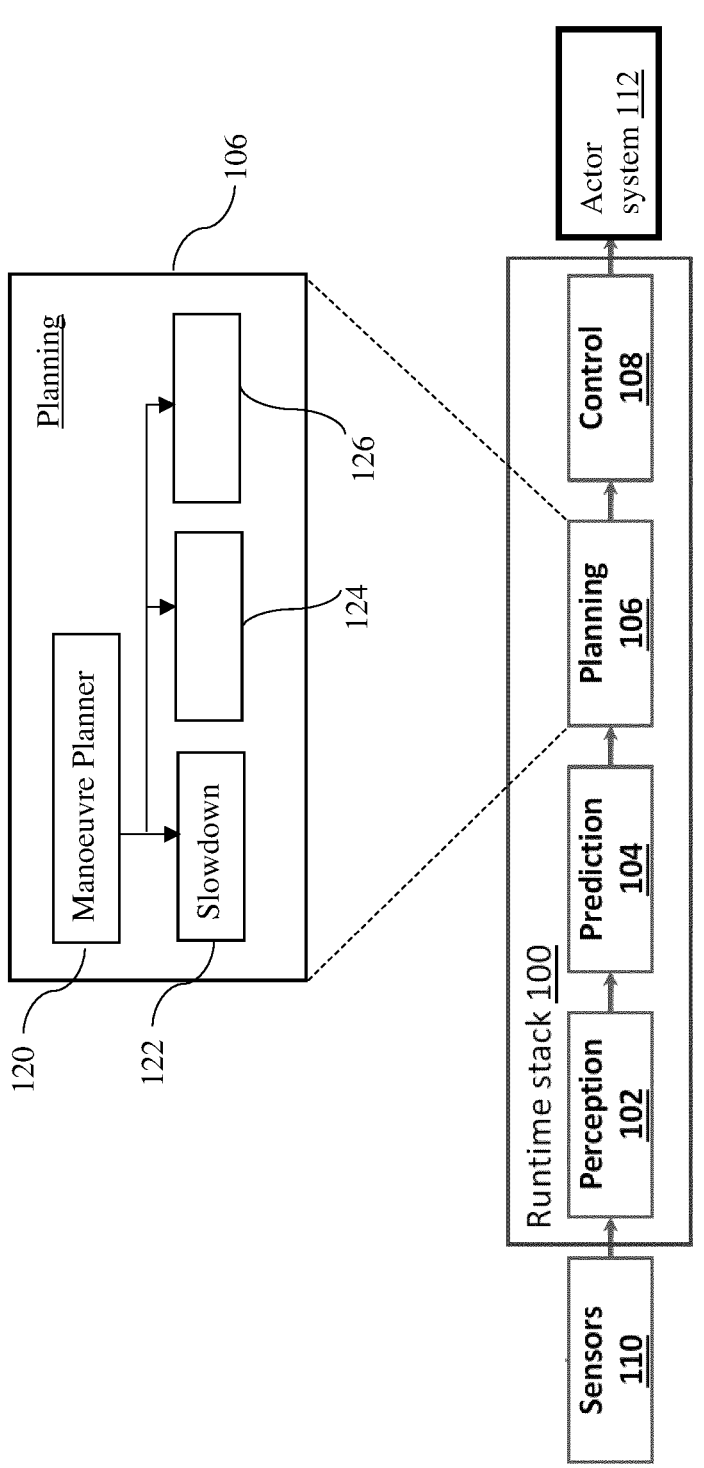
FIG. 4 is a schematic block diagram of a runtime stack for an autonomous vehicle.

FIG. 4 shows a highly schematic block diagram of a runtime stack 100 for an autonomous vehicle (AV). The run time stack 100 is shown to comprise a perception module 102, a prediction module 104, a planner 106 and a controller 108. The AV may be referred to as the ego vehicle, and is denoted by reference numeral 200 in other figures.

The planner 106 is shown to implement a constrained optimisation process 122 for use in carrying out speed change manoeuvres, as described in detail later. The planner 106 may implement additional autonomous planning processes/routines 124, 126 which can be used to carry out other types of manoeuvres. For example, a different type of path planning process may be executed to plan a spatial path for the ego vehicle in a different context (e.g. to follow a particular road/lane, or to follow a forward vehicle (FV) at a safe distance, or to reach a desired exit at a roundabout).

The examples that immediately follow consider "slowdown" maneuvers specifically, where the aim is to reduce the speed of the AV to some target level ("ramp up" maneuvers, where the aim is to increase the speed to some specified target, are considered later). In the context of slowdown maneuvers, the constrained optimization process 122 may be referred to as referred to below as the "slowdown process", "slowdown function" or simply "slowdown". The term "stopping maneuver" may be used herein to refer to a slowdown maneuver with target speed and acceleration of zero. However, that term may also be used more generally to mean any slowdown maneuver with zero or non-zero targets. It will be clear in context what is meant. In any event, a benefit of the slowdown techniques described herein is that they can accommodate different target speeds and accelerations, which can be set on-the-fly, and all description pertaining to stopping maneuvers with zero targets applies equally to slowdown maneuvers with non-zero targets.

The planner 106 is shown to comprise a manoeuvre planner 120 which plans manoeuvres (high-level planning), i.e. determines a manoeuvre to be implemented by the ego vehicle given a current context of the ego vehicle (the planned manoeuvre). Lower-level planning decisions for carrying out the planned manoeuvre can then be taken by a suitable one of the "lower level" planning processes 122, 124, 126.

The manoeuvre planner 120 receives inputs which can be used to plan manoeuvres. At this stage, the planning is high level and used to determine what sort of behaviour or manoeuvre the ego vehicle may have to implement (e.g. stop, follow lane, turn left, overtake etc.) rather than exactly how the manoeuvre is to be carried out. For example, the manoeuvre planner 120 may receive the velocity and acceleration of the ego vehicle 200, the distance between the ego vehicle 200 and a forward vehicle 202, and/or the velocity and acceleration of the forward vehicle 202. These measurements may be received from the perception module 102 and may have been detected by the on-board sensors 110. The term "forward vehicle" is used herein to describe the vehicle directly in front of the ego vehicle 200 traveling along substantially the same path and in the same direction as the ego vehicle.

The perception module 102 receives sensor outputs from an on-board sensor system 110 of the AV.

The on-board sensor system 110 can take different forms but generally comprises a variety of sensors such as image capture devices (cameras/optical sensors), LiDAR and/or RADAR unit(s), satellite-positioning sensor(s) (GPS etc.), motion sensor(s) (accelerometers, gyroscopes etc.) etc., which collectively provide rich sensor data from which it is possible to extract detailed information about the surrounding environment and the state of the AV and any external actors (vehicles, pedestrians, cyclists etc.) within that environment.

Hence, the sensor outputs typically comprise sensor data of multiple sensor modalities such as stereo images from one or more stereo optical sensors, LiDAR, RADAR etc.

Stereo imaging may be used to collect dense depth data, with LiDAR/RADAR etc. proving potentially more accurate but less dense depth data. More generally, depth data collection from multiple sensor modalities may be combined in a way that respects their respective levels (e.g. using Bayesian or non-Bayesian processing or some other statistical process etc.). Multiple stereo pairs of optical sensors may be located around the vehicle e.g. to provide full 360° depth perception.

The perception module 102 (perception module) comprises multiple perception components which co-operate to interpret the sensor outputs and thereby provide perception outputs to the prediction module 104 (prediction module).

The perception outputs from the perception module 102 are used by the prediction module 104 to predict future behaviour of external actors, such as other vehicle in the vicinity of the AV.

Predictions computed by the prediction module 104 are provided to the planner 106, which uses the predictions to make autonomous driving decisions to be executed by the AV in a way that takes into account the predicted behaviour of the external actors.

The controller 108 (control module) executes the decisions taken by the planner 106 by providing suitable control signals to an on-board actor system 112 of the AV. In particular, the planner 106 plans manoeuvres to be taken by the AV and the controller 108 generates control signals in order to execute those manoeuvres.

The actor system 112 may, for example, comprise drive-by-wire steering motors, and a throttle and brake control system.

Figure 5:
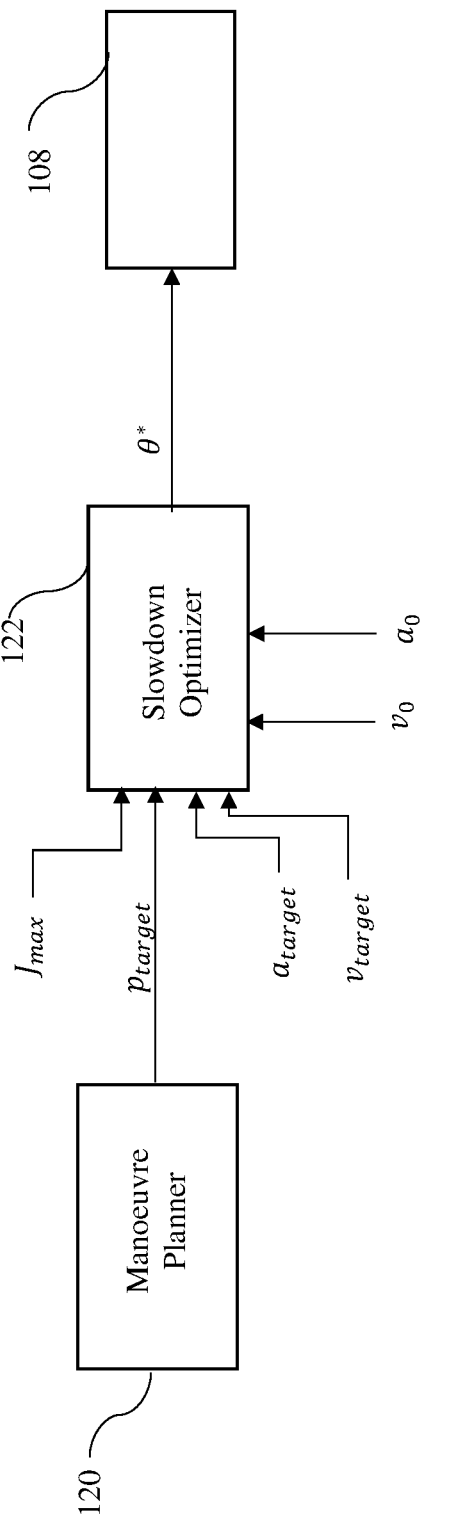
FIG. 5 is a schematic block diagram of a slowdown function implemented within a planner.

FIG. 5 illustrates the maneuver planning process and slowdown process 122 in more detail, in the case that the maneuver planner 120 selects a slowdown maneuver and sets a slowdown distance $p_{target}$ (target position), and the slowdown function 122 is used to carry out the stopping maneuver subject to that constraint. The maneuver planner 120 also sets a target speed $v_{target}$ and acceleration $a_{target}$ to be reached within the slowdown distance $p_{target}$.

A slowdown distance is a distance along the road to a location at which the ego vehicle 200 reaches the target velocity $v_{target}$ and acceleration $a_{target}$ (distance along the road can be defined relative to any suitable reference location, such as the current location of the ego vehicle or a global reference location on the road). That is, the location at which both the velocity and the acceleration of the ego vehicle are zero. The slowdown distance is set by the maneuver planner 120 as the furthest distance along the road at which it is considered safe for the ego vehicle 200 to reach the required speed and acceleration. As noted, this may be set conservatively to account for possible deviation in the actual behaviour of the AV from a trajectory planned by slowdown 122.

Distance along the road is a form of one-dimensional position coordinate and the terms distance and position may be used interchangeably herein, and p(t) and d(t) are used interchangeably herein to denote position/distance.

In some situations, the maneuver planner 120 will determine the slowdown distance $p_{target}$ and the targets $a_{target}$, $v_{target}$ based on a static road layout 150 and any relevant contextual information (such as speed limits within particular areas). The static road layout 150 may be captured in a map, determined using the perception module 102, or a combination of both. The ego vehicle may be equipped with high definition maps of its region of operation which are developed for the purpose of planning, which in some cases may be merged with sensor measurements in the perception module 102. Typically, this would be a non-emergency slowdown scenario, such as stopping at a set of traffic lights, stop line, junction etc., or another form of non-emergency slowdown maneuver, such as slowing down before entering an area with a lower speed limit.

In other situations, the maneuver planner 120 will determine the slowdown distance $p_{target}$ based on "dynamic" inputs 152 pertaining to external actors in the vicinity of the ego vehicle 200. For example, the maximum stopping distance $p_{target}$ along the road may be determined in order to bring the ego vehicle 200 to a stop at some appropriate headway behind a stationary forward vehicle, or to match the speed and acceleration of a non-stationary forward vehicle at a suitable headway from it. An example of this is a non-emergency context would be bringing the ego vehicle 200 to a stop in traffic, or when the forward vehicle is stopped at traffic lights or a junction etc. An example of an emergency context is when another vehicle pulls out in front of the ego vehicle 200, a short distance away from it. In this situation, the maneuver planner 120 may set the slowdown distance $p_{target}$ based on a current position of the other vehicle. The slowdown distance $p_{target}$ may be fixed based on the instantaneous location of the other vehicle (the forward vehicle in this context), or it may take into account measured and/or projected motion of the forward vehicle.

Where possible, the target speed and acceleration $v_{target}$, $a_{target}$ are set in dependence on a speed $v_{FV}$ and acceleration $a_{FV}$ of a forward vehicle respectively, such as a measured, estimated or predicted speed. For example, a measured speed and velocity of the forward vehicle may be propagated to determine a predicted speed and acceleration using a constant or decaying acceleration model and/or an acceleration model that takes into account past observations. In this case, the targets $v_{target}$, $a_{target}$ could be set to match the predicted forward vehicle speed and acceleration, at some suitable headway from it, which could, for example, be set in dependence on the predicted motion of the forward vehicle (e.g. $d_{max}$ could be set in dependence on the predicted forward vehicle speed $v_{FV}$ to increase the headway at higher speeds). Alternatively, the targets may simply be set to match the current speed and acceleration.

In some such cases, the targets $v_{target}$, $a_{target}$ may be set to zero either because the forward vehicle is measured to have approximately zero velocity or acceleration along the road, or because the speed or acceleration of the forward vehicle cannot be reliably determined (setting the targets to zero in this case makes the potentially conservative assumption that the other vehicle might be stationary or might stop very suddenly).

Slowdown 122 provides a form of trajectory planning, in that it determines kinematic values for carrying out a planned maneuver. This will involve computing a distance-time curve d(t) for carrying out the stopping maneuver (as well as speed, acceleration and jerk), i.e. for bringing the ego vehicle 200 to substantially the targets $v_{target}$, $a_{target}$ within the target distance $p_{target}$. However, in the present described example, slowdown 122 does not plan in terms of distance directly, but rather plans in the jerk-time domain (jerk space). Jerk is defined as the rate of change of acceleration:

$$j(t) = \dot{a}(t) = \frac{da}{dt}$$

where a is acceleration and $\dot{a}$ is jerk, also denoted by j herein.

More generally, slowdown 122 plans in "$n^{th}$ order kinematic space", which herein means planning in terms of the kinematic variable defined as the $n^{th}$ order time derivative of acceleration, i.e.

$$k^{(n)}(t) := \frac{d^n}{dt^n} a(t).$$

Under this terminology, jerk space is the $1^{st}$ order kinematic space, with n=1; and "snap", "crackle" and "pop" are second, third and fourth order kinematic spaces respectively (n=2, 3 and 4 respectively) etc.; $k^{(n)}(t)$ is referred to as an $n^{th}$-order kinematic function. In the described examples, this takes the form of a parameterized curve, though the description applies generally to any form of kinematic function define by a set of function parameter(s).

In brief, slowdown 122 formulates this specific trajectory planning problem as a constrained optimization of a cost function, $\mathcal{C}(\theta)$, defined over set of curve parameters $\theta$ that define an $n^{th}$-order kinematic curve having a constrained form, for which the following notation is used:

The subscript θ denotes the fact that this curve has a constrained form defined by the curve parameters θ. The aim is to is to set the curve parameters θ so as to substantially optimize the cost function $\mathcal{C}(\theta)$, but subject to various hard constraints. This can be expressed mathematically as finding:

$$\theta^* = \underset{\theta}{\arg\min}\, \mathcal{C}(\theta)$$

where θ* (the solution) represents values of the curve parameters θ that substantially optimize the cost function subject to the hard constraints.

The first described example considers slowdown planning in jerk space, i.e. order n=1. In this case, slowdown 122 formulates the constrained optimization problem in terms of a jerk-time curve $j_\theta(t)$ having a constrained form.

Figure 1:
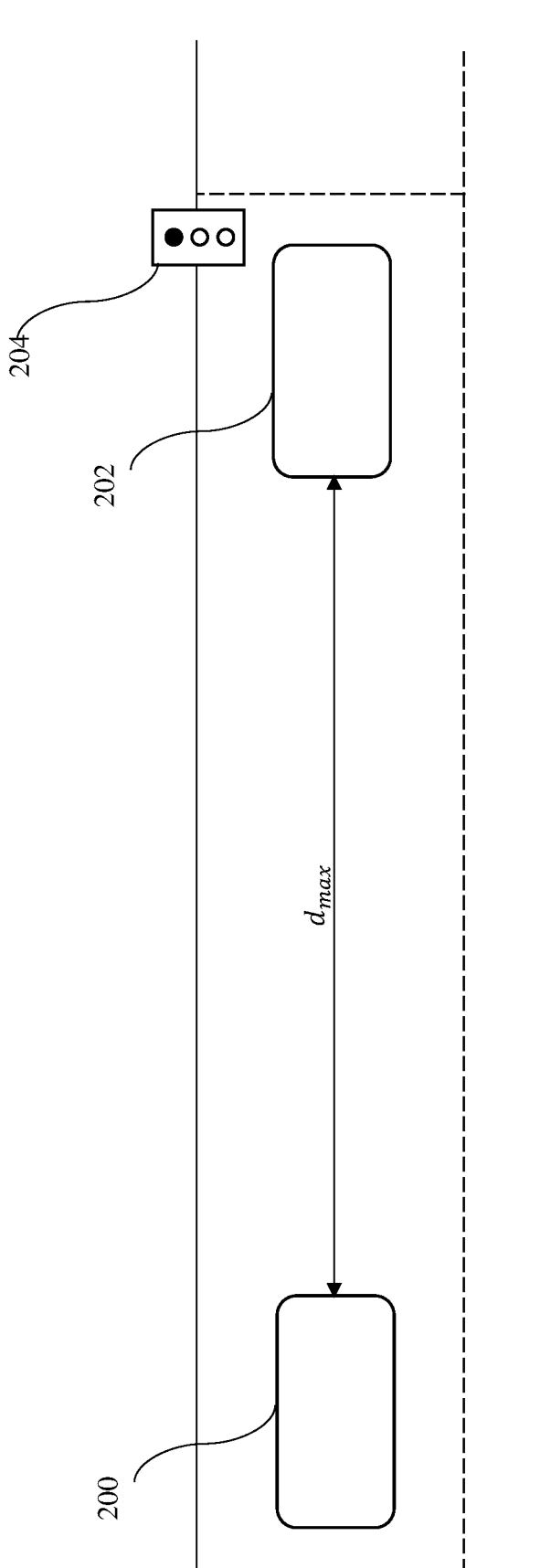
FIG. 1 shows an example scenario in which slowdown is implemented.
Figure 2:
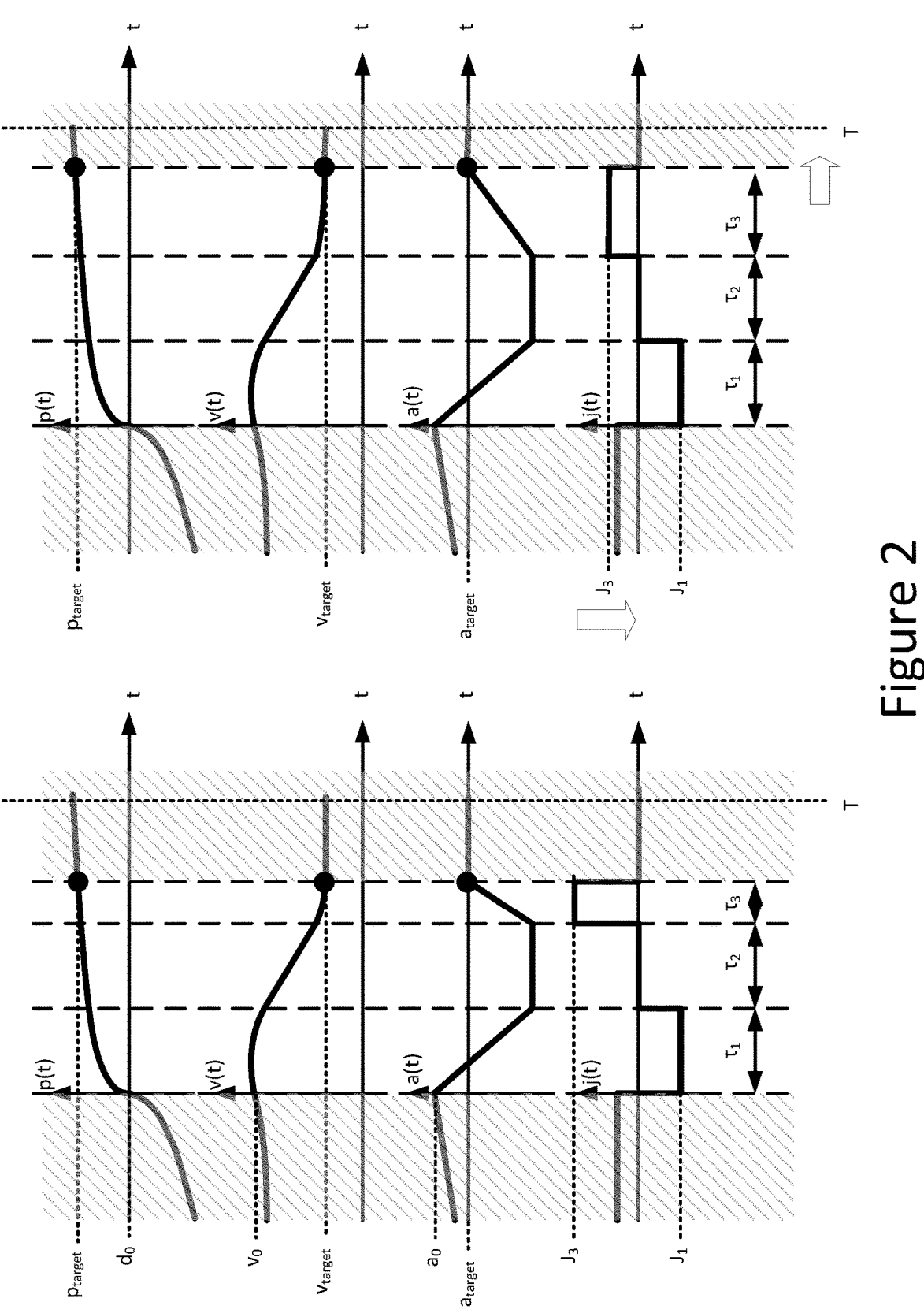
FIG. 2 shows the relationship between a jerk-time curve constrained to take a predetermined form, and acceleration, velocity, and displacement curves in the time domain, as derived from the jerk-time curve.

FIG. 2 shows the particular form of jerk-time curve $j_\theta(t)$ used in the present example. The jerk-time curve j(t) consists of a first interval of constant negative jerk $J_1$, followed by an second interval of zero-jerk, followed by a third interval of constant positive jerk $J_3$, i.e.

$$j_\theta(t) := k_\theta^{(1)}(t) = \begin{cases} J_1 & 0 \le t \le \tau_1 \\ 0 & \tau_1 < t \le \tau_1 + \tau_2 \\ J_3 & \tau_1 + \tau_2 < t \le \tau_1 + \tau_2 + \tau_3 \end{cases} \quad (1)$$

Time t=0 is defined as the start of the first interval though this is an arbitrary choice.

In this case, the curve parameters θ define the jerk-time curve $j_\theta(t)$ and are $\theta = \{\tau_1, \tau_1, \tau_3, J_1, J_3\}$ where $\tau_1$, $\tau_2$ and $\tau_3$ are the duration of the first, second and third intervals respectively.

With this particular formulation, the constrained optimization problem may be formulated as:

$$\tau_1^*, \tau_2^*, \tau_3^*, J_1^*, J_3^* = \underset{\tau_1, \tau_2, \tau_3, J_1, J_3}{\arg\min}\, \mathcal{C}(\tau_1, \tau_2, \tau_3, J_1, J_3) \quad (2)$$

s.t. 1:  $\tau_1 \ge 0$

2:  $\tau_2 \ge 0$

3:  $\tau_3 \ge 0$

4:  $\tau_1 + \tau_2 + \tau_3 \le T$

5:  $-J_{max} \le J_1 \le -J_{min}$

6:  $J_{min} \le J_3 \le J_{max}$

7:  $a_{min} \le a_0 + J_1\tau_1 \le a_{max}$

8:  $a_3 = a_0 + J_1\tau_1 + J_3\tau_3$

9:  $v_3 = v_0 + a_0(\tau_1 + \tau_2 + \tau_3) + \dfrac{J_1}{2}\tau_1^2 + J_1\tau_1(\tau_2 + \tau_3) + \dfrac{J_3}{2}\tau_3^2$ 10:  $p_3 = p_0 + v_0(\tau_1 + \tau_2 + \tau_3) + a_0(\tau_1\tau_2 + \tau_1\tau_3 + \tau_2\tau_3) + J_1\tau_1\tau_2\tau_3 + \dfrac{J_1}{2}(\tau_1^2\tau_2 + \tau_1^2\tau_3 + \tau_2^2\tau_1 + \tau_1\tau_3^2) + \dfrac{a_0}{2}(\tau_1^2 + \tau_2^2 + \tau_3^2) + \dfrac{J_1}{6}\tau_1^3 + \dfrac{J_3}{6}\tau_3^3$ As will be appreciated, this constrained optimization problem can be solved using a variety of known techniques. This does not preclude the use of substitution for the equality constraints, e.g. constraint 8 could potentially be used to substitute one of $J_1$, $\tau_1$, $J_3$ and $\tau_3$ with a relatively simple function of the other three; and potentially the other equality constraints could be used as a basis for substitution. Equality constraints can also be accommodates using e.g. Lagrange multiplier techniques. Optimization techniques such as branch and bound, Russian doll search etc. can accommodate the inequality constraints.

One effective way to perform the optimization is to optimize for each of a set of $\{J_1, J_3\}$ combination (returning $\tau_1$, $\tau_2$, $\tau_3$) and then selecting the solution with the best total score (lowest cost). In other words, multiple iterations of the optimization would be performed, each with fixed values of $J_1$, $J_3$; in each iteration, an optimal solution (lowest cost) would be found, giving optimal values of $\tau_1$, $\tau_2$, $\tau_3$ for every $J_1$, $J_3$ combination; and finally, the best overall solution would be selected (i.e. with lowest overall cost).

Hard Constraints:

The constraints numbered 1 to 10 in Equation (2) are examples of "hard constraints" which any solution θ* must satisfy. The effect of the hard constraints is as follows.

Constraints 8 to 10 force the solution θ* to meet the targets set by the maneuver planner 120. In the notation used to define these constraints, the left-hand terms are the targets, i.e.

$$a_3 := a_{target},$$

$$v_3 := v_{target},$$

$$p_3 := p_{target}$$

The polynomial terms on the righthand sides are the acceleration, speed and distance at the end of the third interval $\tau_3$ (i.e. at time $t=\tau_1+\tau_2+\tau_3$) resulting from the parameters θ and an initial position $p_0$, speed $v_0$ and acceleration $a_0$ (as derived through successive analytical integration of Equation 1 with respect to time, with $p_0$, $v_0$ and $a_0$ as boundary conditions for t=0—see Annex A). Hence, these constraints encode the requirement that the acceleration, speed and position of the ego vehicle must equal the targets $a_3$, $v_3$, $p_3$ respectively at time $t=t_{end}:=\tau_1+\tau_2+\tau_3$. That is, the targets $a_3$, $v_3$ and $p_3$ must all be reached simultaneously at time $t_{end}$.

The time $t_{end}=\tau_1+\tau_2+\tau_3$ at which the targets much be reached is not specified, beyond the requirement that it does not exceed a maximum time T (hard constraint 4). This ensures the maneuver is completed within at or before time t=T.

Hard constraints 5 and 6 require the jerk in the first time interval $J_1$ to be negative and the jerk $J_3$ in the third time interval to be positive, each with a magnitude of at least $J_{min}$ but no greater than $J_{max}$ ($J_{min}$ and $J_{max}$ are both positive).

Figure 2A:
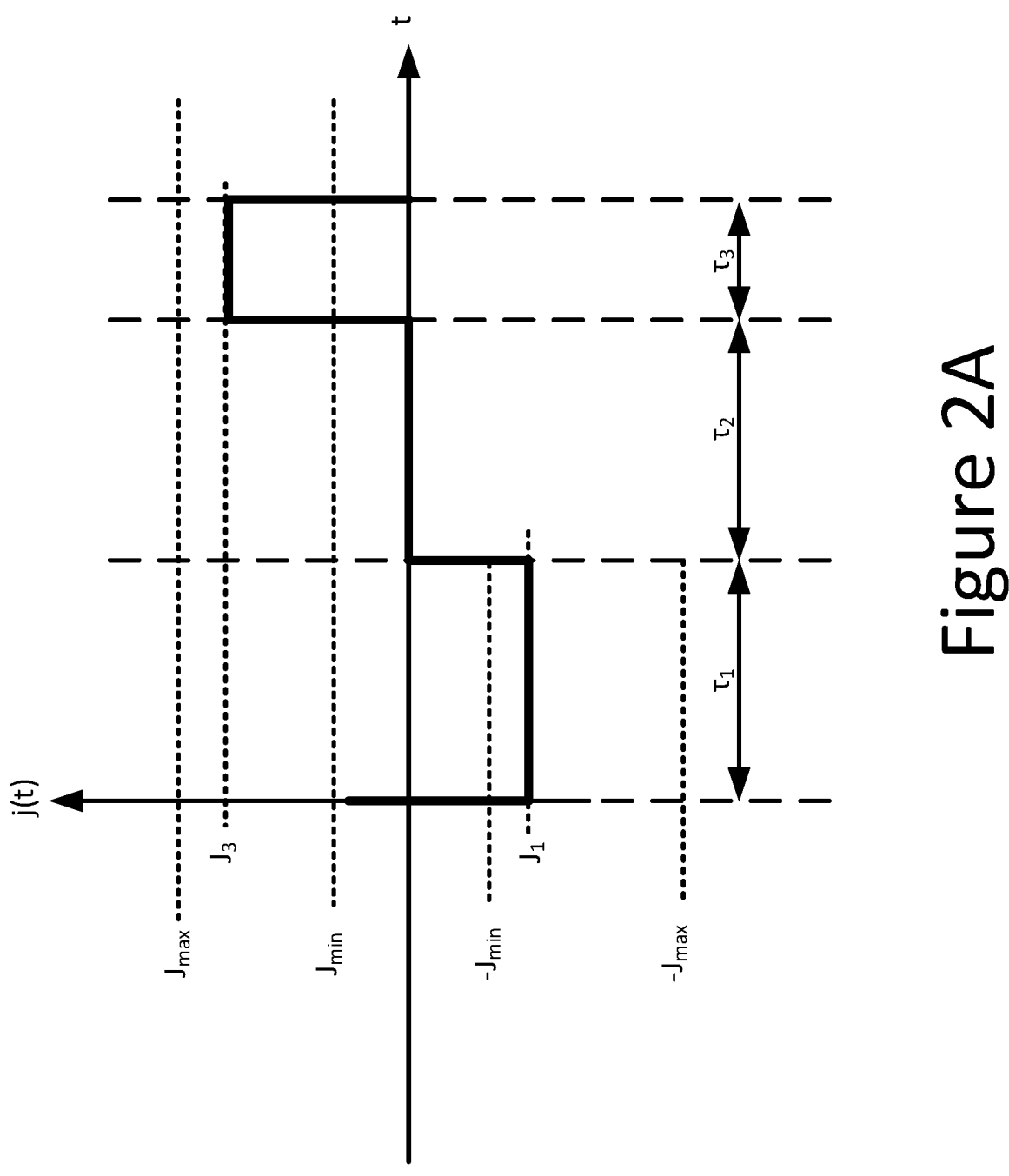

FIG. 2A shows an enlarged version of the jerk-time curve, annotated with the jerk limits.

With regards to hard constraints 5 and 6, jerk is felt by passengers of the ego vehicle 200, and research has been conducted into the relationship between jerk and comfort. Through various tests, the inventors of the present invention have found that excessive jerk magnitude is more likely to cause discomfort than long intervals of lower-magnitude jerk. On that basis, optimization of comfort is achieved in the present embodiment with explicit constraints on jerk magnitude, but without any explicit constraints on the duration of any interval of sustained non-zero jerk.

Purely by way of example, FIG. 2 shows how $\tau_3$ might be extended in the search for an optimal solution. In this example, the effect of that increase is offset by a reduction in $J_3$ to ensure the targets are still reached at the end of $\tau_3$. As will be appreciated, this is a highly simplified example to illustrate the basic principles of the constrained optimization within the targets (also, as noted above, one optimization method fixes $J_1$ and $J_3$ in a given iteration, and then looks for optimal durations; which is different to what is shown in FIG. 2).

In hard constraint 7, $a_0+J_1\tau_1$ is the acceleration reached at the end of the first time interval and sustained throughout the second interval ($a_0$ being the initial acceleration and $J_1\tau_1$ being the change in acceleration causes by the jerk $J_1$ sustained throughout the first time interval). In the right hand inequality, $a_{max}$ is a negative upper limit on the acceleration, i.e. whatever the value of the initial acceleration $a_0$ (positive, negative or zero), by the end of the first time interval, the acceleration must be negative (i.e. the trajectory must be in a decelerating state) with acceleration magnitude no less than $|a_{max}|$; $a_{min}$ is negative and less than $a_{max}$ (such that $|a_{min}|>|a_{max}|$), and the left hand inequality prevents the magnitude of the acceleration exceeding $|a_{min}|$ (i.e. it imposes a floor on the maximum deceleration). In effect, this imposes an upper of $|a_{min}|$ on the maximum acceleration magnitude: $|a_0+J_1\tau_1|$ is the maximum magnitude the acceleration because of constraint 6, which requires the jerk $J_3$ in the third interval to be positive (see FIGS. 2 and 2A).

Figure 2B:
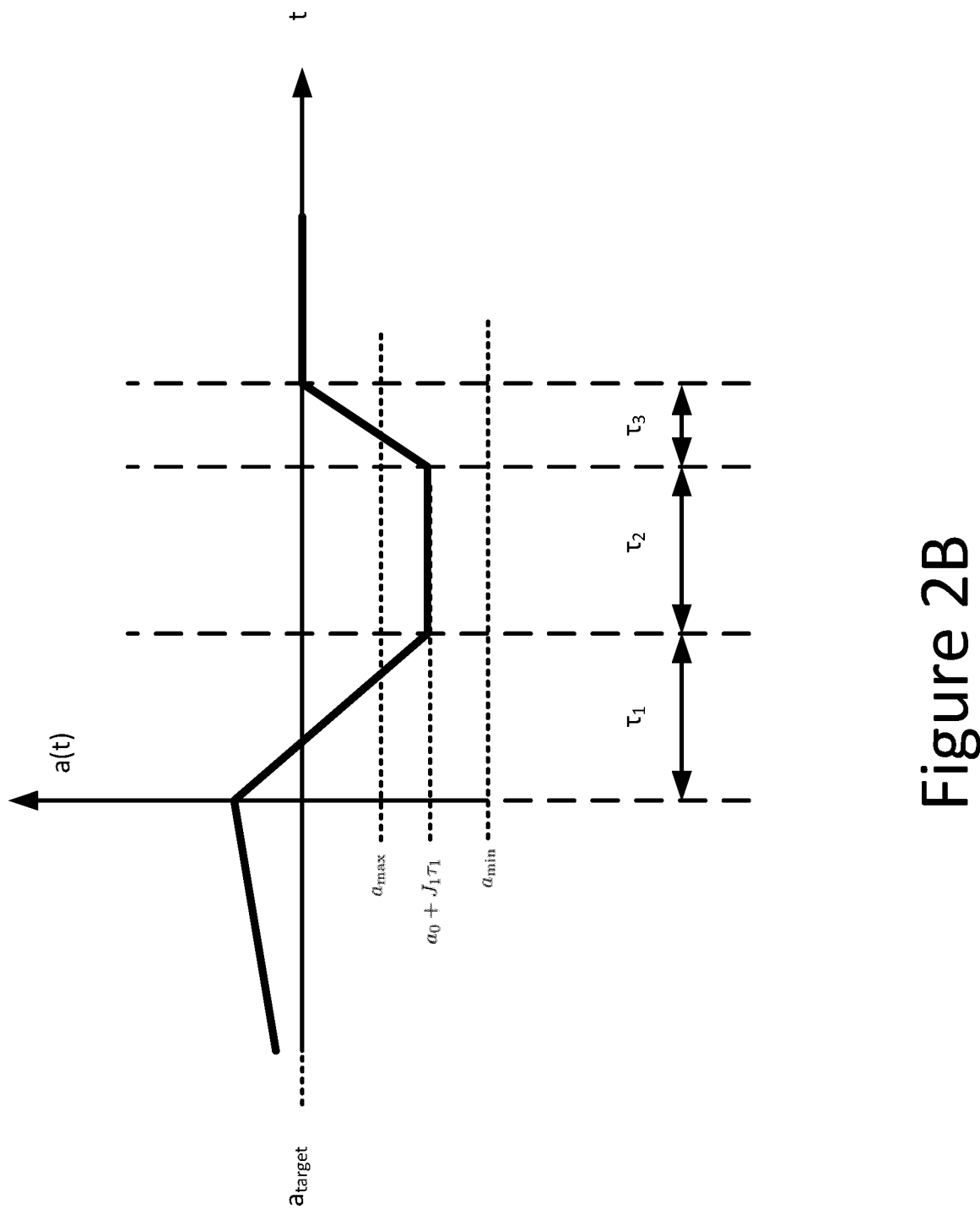

FIG. 2B shows an expanded view of the acceleration-time curve, annotated with the acceleration limits.

Hard constraints 1 to 3 prevent non-physical solutions with time intervals of negative duration.

Constraining the form of the jerk-time curve as in Equation 1 has the effect of reducing the general constrained optimization problem to the much simpler problem of finding values for the parameters that optimize the cost function, to the extent possible given the other hard constraints. This is described in further detail below, with reference to FIG. 2. Note that, for the purpose of the optimization, all of the information about the constrained form is encoded by defining the cost function in terms of the curve parameters $\theta$ and by setting the hard constraints appropriately. In particular, hard constraints 8 to 10 fully encode the relationship between jerk, acceleration, speed and position (implicit in Equation 1) in terms of simple closed-form functions. The ability to encode the form of the curve in this manner stems from the fact that the jerk-time curve of Equation (1) can be integrated analytically, i.e. successive integrals with respect to time can be expressed in closed form.

Although not captured in Equation 2, a magnitude limit on speed might also be imposed on speed. For example, if slowdown is starting from a state of positive acceleration, without an explicit limit on speed, the initial jerk of the first interval $\tau_1$ may not be sufficient to prevent the speed increasing above a speed limit or other speed threshold. Therefore, a hard constrain on speed magnitude may be useful.

Cost Function:

With the hard constraints above, a simple but reasonably effective cost function can be used, which only takes into account the time taken to complete the maneuver, such as $$\mathcal{C}_{(\tau_1,\tau_2,\tau_3)}=w_1\tau_1+w_2\tau_2+w_3\tau_3. \tag{3}$$

In Equation 3, $w_1$, $w_2$ and $w_3$ are weights applied to each time interval. With similar values of the weights, the cost function simply penalizes total time taken to complete the maneuver (i.e. the cost increases as $\tau_1+\tau_2+\tau_3$ increases; $t_{end}=\tau_1+\tau_2+\tau_3$ being the time at which the targets must be reached, as per hard constraints 8 to 10 in Equation 2). With different values of the weights, an increase in the duration of one-time interval may be penalized more heavily (i.e. cause a greater increase in cost) that an equivalent increase in the duration of another.

Equation 3 can therefore be seen to embody an objective of minimizing the duration of each time interval. The terms "soft constraint" may be used to refer to an objective encoded in the cost function itself.

A second example cost function considered herein encodes additional jerk-minimization objectives:

$$\mathcal{C}_{(\tau_1,\tau_2,\tau_3,J_1,J_3)}=w_1\tau_1+w_2\tau_2+w_3\tau_3+w_4(J_1)^2+w_5(J_3)^2+w_6(J_1+J_3)^2. \tag{4}$$

The fourth and fifth terms have the effect of penalizing increases in the amount of jerk applied in the first and third time intervals. These are a form of soft comfort constraint, which encourage jerk of lower magnitude (or, more precisely, jerk squared—the cost penalty increases quadratically as the magnitude of the jerk increases).

The sixth term in Equation 4 penalizes differences in the magnitude of jerk applied in the first and third intervals, i.e. it encourages a similar magnitude of jerk to be applied in the first and third time intervals (from hard constraints 5 and 6 in Equation 2, $J_1$ must be negative and $J_3$ must be positive, so term 6 is zero when $J_1$ and $J_3$ have equal magnitude).

The constrained optimization attempts to set the parameters in a way that minimizes the cost function C (however it is defined), but without violating any of the hard constraints. Hence, the cost function encourages the fulfilment of the objectives (soft constraints) it encodes to the extent that is possible within the hard constraints. In other words, the solution $\theta*$ with the highest overall score (lowest cost) that also meets all of the hard constraints is selected at the end of the constrained optimization process.

Suitable values of the weights may be determined through routine experimentation. These may be tuned to mirror "normal" driving behaviour determined through observation of actual human drivers. This could be manual tweaking based on qualitative observations, or machine learning techniques could be used to set the parameters through structured training.

Returning to FIG. 5, the controller 108 is shown to receive the substantially optimal parameters $\theta*$ and converts them into a series of control signals. The series of control signals specifies the braking required in order to implement the substantially optimal jerk-time series $j_{\theta*}$ (t), thereby bringing the ego vehicle 200 to a halt without substantially exceeding the slowdown distance $d_{target}$. The series of control signals can be derived from the jerk-time series $j_{\theta*}$ (t) in any suitable manner, directly or indirectly. For example, it could be that what is actually provided to the controller 108 is a position-time p(t) derived analytically as a third order integral of $j_{\theta*}$ (t) with respect to time, or any other kinematic information derived from the substantially optimal parameters $\theta*$.

Constrained Form of Jerk Curve:

The considerations behind the constraint on the form of the jerk-time curve will now be described in further detail.

FIG. 2 shows a series of graphs showing the relationship between displacement, velocity, acceleration, and jerk for a jerk-time curve of the form $j_\theta(t)$. The graphs show the time interval between implementing slowdown, i.e. when the manoeuvre planner 120 selects slowdown 122, at t=0 and the end of the maneuver at time $t_{end}=\tau_1+\tau_2+\tau_3$. Prior to t=0, the motion of the ego vehicle is not planned by slowdown 122, but rather by some other trajectory planner of the maneuver planner 120 or planning module 106.

Time periods in which motion is planned outside of slowdown are denoted using diagonal shading. Slowdown 122 only plans within the non-shaded interval, the duration of which is not fixed, but is limited to be no more than T (hard constraint 4).

The bottom graph shows the constrained form of jerk curve $j_\theta(t)$ (jerk profile) as defined in Equation 1. The jerk-time curve defined by specific values of the parameters θ can be considered one of a family of jerk-time curves, which all exhibit this predetermined form.

After t=0, the jerk profile is defined over the three time intervals $\tau_1$, $\tau_2$, and $\tau_3$.

This particular example shows a small amount of constant positive jerk prior to t=0, implying a gradually linearly increasing acceleration and quadratically increasing speed. However, this is merely an example and slowdown can commence from any initial jerk value.

At t=0, there is a step in jerk from whatever value it happened to have just before t=0 to a negative jerk $J_1$. The jerk remains constant during the first time interval.

At time t=$\tau_1$, the end of the first time interval, there is a second step in jerk from $J_1$ to 0 m/s³.

The jerk remains constant at 0 m/s³ during the second time interval.

At time t=$\tau_1$+$\tau_2$, the end of the second time interval, there is a third step in jerk, the jerk increasing from 0 m/s³ to $J_3$. The jerk is constant at $J_3$ for the third time interval.

At time $t_{end}$=$\tau_1$+$\tau_2$+$\tau_3$ there happens to be a final step down in jerk to 0 m/s³—however, this is merely an example, and in any event is something that would be determined not by slowdown 122 but elsewhere in the planning module 106 (i.e. from whatever trajectory planning component takes over from slowdown 122 after time $t_{end}$).

The simple form of jerk profile shown at the bottom of FIG. 2 means that corresponding acceleration-time, velocity-time and distance-time curves a(t), v(t) and p(t) can be derived analytically as a set of closed form functions in t, which in turn can be used to derive the hard constraints 7 to 10 above. The closed form polynomial equations defining a(t), v(t) and p(t), and their derivation using basic calculus, are provided in Annex A for information. However, these are simply provided to illustrate how hard constraints 7 to 10 in equation 2 have been arrived at—the curve functions themselves are not applied or required by the slowdown optimizer. All the optimizer needs to compute an optimal trajectory is the cost function and the hard constraints. It does not need to actually derive the full acceleration, speed and distance-time curves.

This is one example of a "closed form" representation of a(t), v(t) and d(t). As will be appreciated, deriving those curves in terms of closed-form equation is possible not only with the jerk-time curve of FIG. 2, but also other constrained forms of jerk curve provided the form of the jerk-time curve is relatively simple.

Alternatively, a jerk-time curve could be numerically integrated over time to obtain $a_{0:t_{end}}$, $v_{0:t_{end}}$ and $d_{0:t_{end}}$ (where the subscript notation denotes discrete time samples between t=0 and t=$t_{end}$), which may be appropriate for more complex forms of jerk-time curve in particular. The principles remain the same—the jerk-time curve is still defined by a relatively small number of curve parameters that constrain its form, and the optimization is performed over those parameters, with the same benefits of efficiency and robustness (where the term robust refers to reliable convergence in this context).

As will be appreciated in view of the teaching presented herein, those benefits can be obtained with different constraints on the form of the jerk-time curve, whilst still preserving the benefits of efficiency and/or robustness. Determining whether or not any given constraint on the form of the jerk curve is sufficient to achieve one or both of those benefits would be a matter of routine experimentation.

Figure 3:
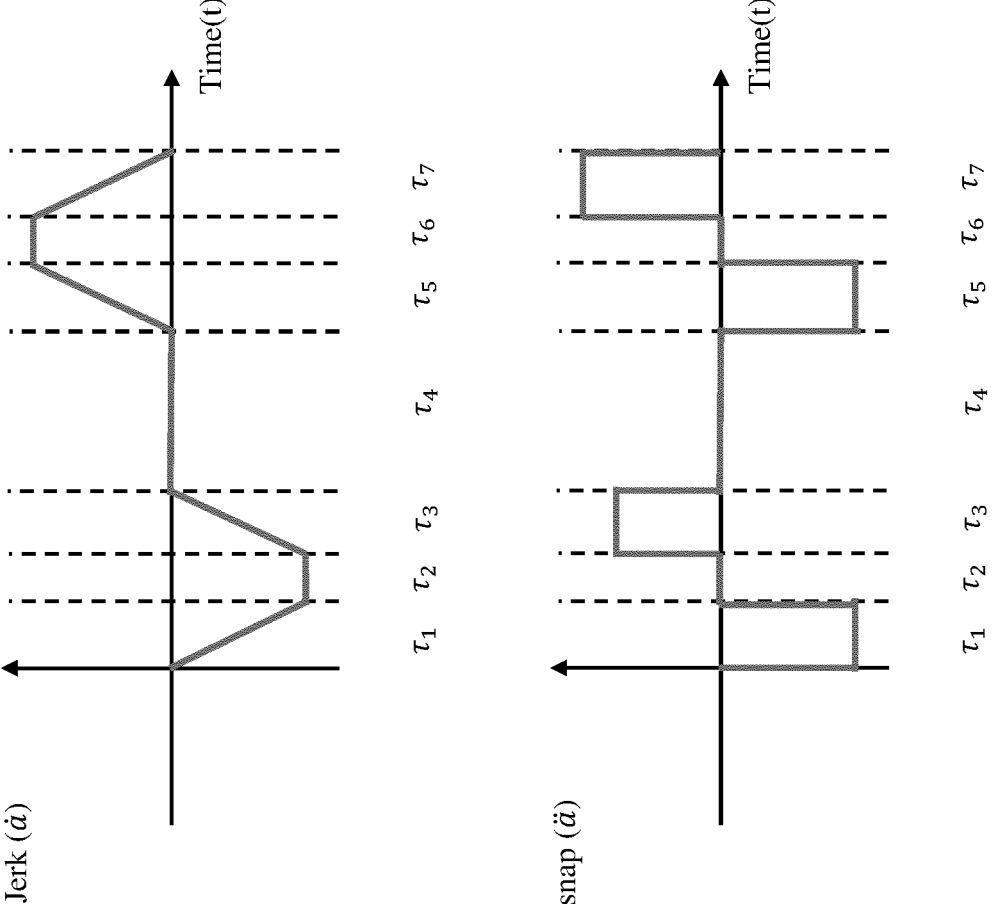
FIG. 3 shows a jerk-time curve having a different predetermined form.

Optimizing in Snap Space:

FIG. 3 shows one example of alternative jerk profile which may be used. This differs from the jerk profile of FIG. 2 as it does not comprise step responses in jerk, but rather has intervals over which the jerk increases and decreases. These sections correspond to intervals over which the acceleration of the ego vehicle 200 changes at a variable rate (i.e. is represented by a quadratic equation). The jerk profile of FIG. 3 is defined over 7 time intervals, where the vehicle exhibits a different jerk behaviour in each interval. As such, the corresponding jerk-time sequence has 7 terms. The jerk profile defines the form of the jerk-time series, that is the number of time intervals and the shape of the profile within the time interval. The relative time sequence of the types of jerk (e.g. constant positive magnitude, constant negative magnitude, increase in jerk, decrease in jerk, etc.) must also remain the same in this case.

This would mean that the optimisation is not done in jerk space, but in snap space, meaning one more constraint equation in the optimisation process. Snap would then be characterised by discrete jumps freely set, and jerk, acceleration, velocity and position would be gained though integration over time, keeping their maximum allowed values in mind.

That is to say, in this case, planning can be performed efficiently in snap space rather than jerk space (i.e. the second order kinematic domain). The bottom part of FIG. 3 shows a snap-time curve, with constant negative snap in the first and fifth time intervals, constant positive snap in the third and seventh, and zero in all others. In this case, the curve parameters θ would define the snap curve $s_\theta(t)$ and would consist of the duration of each of the seven time intervals and the amount of snap in intervals 1, 3, 5 and 7 (which may be set differently to each other).

Closed form functions for jerk, acceleration, speed, and distance can be derived via analytical time integration, and used to set suitable hard constraints, such as jerk limits (which would now be defined in terms of the parameters θ that define the snap-time curve) and acceleration limits (similarly defined in terms of snap parameters), as well as the constraints that the targets must be met at the end of the seventh interval, applying exactly the same principles as set out in Annex A, but now starting from the snap-time curve, and with an additional integration needed to derive all of the closed form functions down to position.

In this case, an additional hard constraint could be imposed on the final jerk value (at time $t_{end}$) as well, formulated in terms of a jerk target.

Natural Braking:

In the context of slowdown, "natural" braking has been found to be an important aspect. This means braking behaviour that is reasonably well aligned with normal human driver behaviour.

There are various considerations that underpin natural braking. Firstly, given plenty of distance in which to slowdown to reach the targets, jerk and acceleration magnitude could be minimized by commencing the slowdown maneuver as soon as possible. However, whilst braking too far from the target stopping position $p_{target}$ can provide a trajectory that is, in one sense, more comfortable for the passenger, it has been found that braking too early feels highly unnatural for the passenger, and for other vehicles on the road who need to respond to the AV's behaviour. That is, although it is notionally more comfortable to brake earlier (because it can permit lower jerk magnitude), a higher jerk and shorter braking duration may be preferable, since that more closely reflects normal human driving behaviour. Another key reason is that the environment is dynamic and thus early optimisation (i.e. committing to brake while far away) would be sub-optimal anyway if (when) the environment changes (e.g. FV may start moving again, traffic light turns green etc.). In the present implementation, the decision about when to start braking is a decision taken within the planner 106 about when to instigate the slowdown maneuver (i.e. this is not considered within the slowdown constrained optimization framework, but rather is a decision about when to instigate the constrained optimization).

The second aspect to natural braking is duration. For example, an unnatural behaviour would be aggressive braking in the first interval followed by a slow cruise for a very long time. This is discouraged by the hard and soft time constraints.

The minimum jerk/acceleration limits $J_{min}$ and $a_{min}$ in the hard constraints mean that the braking time scales with initial velocity.

Figure 6:
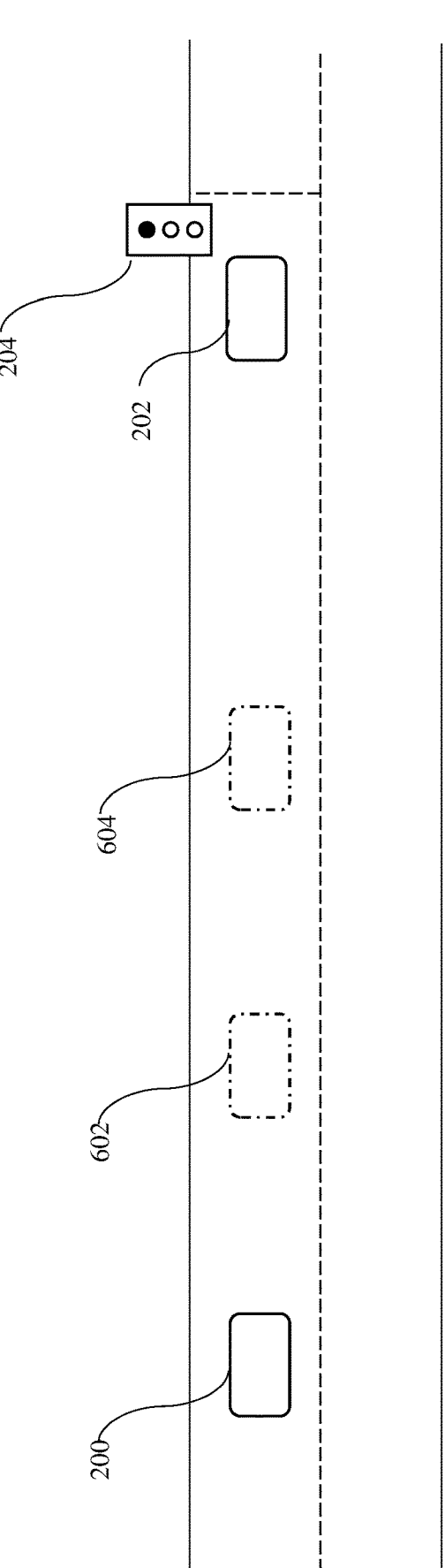
FIG. 6 illustrates how a braking duration threshold may be applied with a constrained optimisation planning framework.

FIG. 6 further illustrates the concept of a natural braking distance by example.

The ego vehicle 200 is approaching the forward vehicle 202 which is stationary at the red traffic light 204. The ego vehicle 200 must, therefore, come to a stop. This example considers a stationary forward vehicle, whose measured speed and acceleration is zero, however, the same principles apply equally to a non-stationary FV, or indeed with no FV whatever.

The lowest jerk when bringing the ego vehicle 200 to a stop would be experienced if the ego vehicle began braking immediately since it has the largest distance to stop so can apply the lightest braking. However, light braking over a long distance feels unnatural to the passengers of the ego vehicle 200. Therefore, braking is not implemented immediately.

When to start braking, i.e. the time at which the slowdown 122 is initiated, is determined by some higher-level planning component, such as the maneuver planner 120.

FIG. 6 shows two possible locations of the ego vehicle when it first implements braking.

At location 604 closest to the traffic lights, the ego vehicle is able to stop before reaching the forward vehicle 202. It is also close enough to the forward vehicle 202 that the braking duration would not feel unnaturally long. However, the jerk experienced if the ego vehicle only begins braking when it is at location 604 will be high. It may, for example, be greater than the jerk magnitude threshold for non-emergency scenarios such that the maximum jerk magnitude is experienced.

If, however, the ego vehicle begins to brake earlier, at location 602, it is able to stop before reaching the FV 202 but the jerk experienced is lower. The required jerk is higher than if braking is implemented immediately, but there is a trade-off between higher jerk and a more natural feeling braking duration. The ego vehicle 200 would, therefore, begin braking at location 602. The following section described how a time at which to instigate slowdown 122 is determined.

Comfortable Vs Slowdown Constraints

The limits $J_{max}$, $J_{min}$, $a_{max}$, $a_{min}$ (kinematic constraints) may be set different depending on the context. The following examples consider "slowdown" constrains and "comfortable" constraints, where slowdown constraints are used, as above, in the full slowdown optimization.

With comfortable constraints, $J_{max}$ and $a_{max}$ have lower magnitudes (reduced limits), and are denoted $\hat{J}_{max}$ and $\hat{a}_{max}$ to distinguish from the full slowdown constraints. These are examples of optimal comfort conditions. Comfortable constraints are not used in the full slowdown process. Rather, these are used to implement a simplified process, in order to determine when to initiate the full slowdown optimization 122.

With reference to FIG. 6, in determining the time t=0 at which to commence slowdown (at position 602 in FIG. 6), the aim of the maneuver planner 120 is to instigate slowdown at a point when it is only just no longer possible to find a solution within the comfortable constraints $\hat{J}_{max}$ and $\hat{a}_{max}$.

This point in time t=0 is determined by a higher-level algorithm of the planning module 106 (within the maneuver planner 120) that computes a simplified kinematic equation. The algorithm assumes a maximum comfortable negative jerk $\hat{J}_{max}$ until the maximum comfortable negative acceleration $\hat{a}_{max}$ is reached, then keeps acceleration constant (zero jerk) until the target velocity is reached (preliminary trajectory). In each time step of this calculation, it is computed whether a safe distance, given the forward vehicle's velocity and acceleration, can be kept (initiation condition). The FV is propagated using a constant or decaying acceleration model. If the safe distance cannot be kept with the comfortable kinematic constraints or the stop point is overshot, slowdown is initiated, allowing for higher kinematic constraints to be used.

In other words, in this particular example implementation, the comfortable constraints only to determine when to initiate slowdown—and slowdown is initiated immediately as soon as it is determined that a solution within the comfortable constraints no longer exists. Slowdown is initiated with the higher (less stringent) slowdown constraints (not comfortable constraints)—but in the expectation that the solution will only just exceed the comfortable constraints, because of the time at which slowdown was initiated. If no solution can be found within the slowdown constraints for any reason, the planner 106 revers to some other routine (such as a different form of emergency braking, or something that requires driver intervention etc.).

Herein, a "non-emergency" scenario would be one in which the planner has enough freedom to delay the instigation of slowdown 122 until the ideal time, using the above approach. Here, the aim is not to fully utilise the slowdown constraints; rather, the optimiser is expected to find a solution just above the comfortable constraints (the sooner slowdown is implemented, the closer the solution will likely be to the comfortable constraints).

An "emergency" or "tight" scenario would be one in which a slowdown maneuver has to be implemented immediately, typically in response to some sudden event, such as a vehicle pulling out. There is not necessarily any difference in how these are handled within the planning module 106 in terms of the method applied—it may simply be the case that the maneuver planner immediately fails to find a solution with the comfortable constraints, and is therefore caused to implement actual slowdown (with the slowdown constraints) immediately. How close it is able to get to the comfortable constraints will depend on the specifics of the situation—if necessary, the optimizer can go all the way up to the slowdown constraints, but is discouraged from doing so to the extent possible by aiming to instigate slowdown 122 sufficiently early whenever possible.

In the event that no solution can be found within the slowdown constraints, then the planning module 106 will revert to some other routine (which could be automated, or may require driver intervention).

Ramp Up Maneuvers

Ramp up is the opposite of slowdown—here, the aim is to increase the speed of the vehicle within some specified targets. The fundamental principles are the same. When planning in jerk space, as in FIG. 2, the sign of the jerk in the first and third intervals is reversed, i.e. $J_1$ is now positive and $J_3$ is now negative. Similarly, when planning in snap space, as in FIG. 3, the snap in the first and fifth intervals is positive, and the snap in the third and seventh intervals is negative. This is an effective way to ramp up to a target speed within a target distance.

It will be appreciated that the various cost functions and hard constraints set out above are provided by way of illustration only. Alternative formulations will be apparent to those skilled in the art in view of the teaching presented herein. For example, whilst in Equation 2, acceleration, speed and position targets are imposed via equality constraints (requiring the solution to always end at specific acceleration, speed and position values), the targets could instead be set in terms of ranges, i.e. the hard constraints would require the final acceleration, speed and position to fall within specified target ranges (rather than single target values). In some such cases, additional soft constrains could be embodied in the cost function, to encourage (but not require) solutions with final values that fall at a particular point within the range (e.g. a hard constraint could be that the final position is within a particular range of positions, and a soft constrain adds a cost penalty for positions away from a specific target position within the range).

The equality constrains of Equation 2 mean that the curve parameters θ, in this context, are not fully independent. However, this would change if these were relaxed to be inequality constrained (i.e. to accommodate target ranges on position, speed and/or velocity in the hard constraints).

Whilst in the above, the full set of targets are set dynamically by the maneuver planner, a simpler implementation could use certain fixed targets. For example, a dedicated stopping maneuver could use fixed acceleration and velocity targets of zero.

The runtime stack 100 of FIG. 4 is implemented by an on-board computer system of the AV (not shown). The on-board computer system comprises execution hardware which is configured to execute the method/algorithmic steps disclosed herein. The term execution hardware encompasses any form/combination of hardware configured to execute the relevant method/algorithmic steps. The execution hardware may take the form of one or more processors, which may be programmable or non-programmable, or a combination of programmable and non-programmable hardware may be used. Exampled of suitable programmable processors include general purpose processors based on an instruction set architecture, such as CPUs, GPUs/accelerator processors etc. Such general-purpose processors typically execute computer readable instructions held in memory coupled to the processor and carry out the relevant steps in accordance with those instructions. Other forms of programmable processors include field programmable gate arrays (FPGAs) having a circuit configuration programmable though circuit description code. Examples of non-programmable processors include application specific integrated circuits (ASICs). Code, instructions etc. may be stored as appropriate on transitory or non-transitory media (examples of the latter including solid state, magnetic and optical storage device(s) and the like).

The runtime stack 100 can also be implemented in an off-board computer system. For example, it may be applied to simulator inputs generated in a simulator for the purpose of safety and other performance testing.

The slowdown techniques taught herein can be applied at any level of autonomy. The described examples consider an implementation within a sophisticated runtime stack of the kind envisaged to support level 4 or level 5 driving autonomy. However, it will be appreciated that slowdown can also be implemented in a semi-autonomous vehicle as a form of driver-assistance technology.

It will be appreciated that the above embodiments have been described by way of example only. Other variants or use cases of the disclosed techniques may become apparent to the person skilled in the art once given the disclosure herein. The scope of the disclosure is not limited by the described embodiments but only by the accompanying claims.

Annex A

With reference to FIG. 2 and Equations 1 and 2 above, this Annex sets out the closed-form representation of acceleration, speed and position curves for slowdown in the first order kinematic domain, and shows, in turn, how hard constraints 7 to 10 in Equation 2 may be derived from these.

We use $t \in \tau_i$ is used as shorthand to mean times within the $i^{th}$ interval, and for conciseness define additional time variables $$t_2 = t - \tau_1,$$

$$t_3 = t - \tau_1 - \tau_2.$$

Acceleration:

$$a(t) = \int_0^\tau j(t')dt' = \begin{cases} a_0 + J_1 t & t \in \tau_1 \\ a_0 + J_1 \tau_1 & t \in \tau_2 \\ a_0 + J_1 \tau_1 + J_3 t_3 & t \in \tau_3 \end{cases}$$

Hard constraint 8 is derived by requiring the acceleration at the end of the third interval ($t_3 = \tau_3$) to match the target acceleration $a_3$, i.e.

$$a_3 = a_0 + J_1 \tau_1 + J_3 \tau_3.$$

Hard constraint 7 is derived follows from $$\max a(t) = a_0 + J_1 \tau_1$$

on which the limits $a_{min}$, $a_{max}$ are imposed.

Speed:

$$v(t) = \int_0^\tau a(t')dt' =$$

$$\begin{cases} v_0 + a_0 t + \frac{J_1}{2} t^2 & t \in \tau_1 \\ v_0 + a_0 \tau_1 + \frac{J_1}{2} \tau_1^2 + a_0 t_2 + J_1 \tau_1 t_2 & t \in \tau_2 \\ v_0 + a_0 \tau_1 + \frac{J_1}{2} \tau_1^2 + a_0 \tau_2 + J_1 \tau_1 \tau_2 + a_0 t_3 + J_1 \tau_1 t_3 + \frac{J_3}{2} t_3^2 & t \in \tau_3 \end{cases}$$

Hard constraint 9 is derived by requiring the speed at the end of the third interval ($t_3 = \tau_3$) to match the target speed $v_3$, i.e.

$$v_3 = v_0 + a_0\tau_1 + \frac{J_1}{2}\tau_1^2 + a_0\tau_2 + J_1\tau_1\tau_2 + a_0\tau_3 + J_1\tau_1\tau_3 + \frac{J_3}{2}\tau_3^2$$

$$= v_0 + a_0(\tau_1 + \tau_2 + \tau_3) + \frac{J_1}{2}\tau_1^2 + J_1\tau_1(\tau_2 + \tau_3) + \frac{J_3}{2}\tau_3^2$$

Position:

$$p(t) = \int_0^t v(t')dt'$$

For $t \in \tau_1$, $$p(t) = p_0 + v_0 t + \frac{a_0}{2}t^2 + \frac{J_1}{6}t^3$$

For $t \in \tau_2$, $$p(t) = p_0 + v_0\tau_1 + \frac{a_0}{2}\tau_1^2 + \frac{J_1}{6}\tau_1^3 + v_0 t_2 + a_0\tau_1 t_2 + \frac{J_1}{2}\tau_1^2 t_2 + \frac{a_0}{2}t_2^2 + \frac{J_1}{2}\tau_1 t_2^2$$

For $t \in \tau_3$, $$p(t) =$$

$$p_0 + v_0\tau_1 + \frac{a_0}{2}\tau_1^2 + \frac{J_1}{6}\tau_1^3 + v_0\tau_2 + a_0\tau_1\tau_2 + \frac{J_1}{2}\tau_1^2\tau_2 + \frac{a_0}{2}\tau_2^2 + \frac{J_1}{2}\tau_1\tau_2^2 +$$

$$v_0 t_3 + a_0\tau_1 t_3 + \frac{J_1}{2}\tau_1^2 t_3 + a_0\tau_2 t_3 + J_1\tau_1\tau_2 t_3 + \frac{a_0}{2}t_3^2 + \frac{J_1}{2}\tau_1 t_3^2 + \frac{J_3}{6}t_3^3$$

Hard constraint 10 is derived by requiring the position at the end of the third interval ($t_3 = \tau_3$) to match the target position $p_3$, i.e.

$$p_3 =$$

$$p_0 + v_0\tau_1 + \frac{a_0}{2}\tau_1^2 + \frac{J_1}{6}\tau_1^3 + v_0\tau_2 + a_0\tau_1\tau_2 + \frac{J_1}{2}\tau_1^2\tau_2 + \frac{a_0}{2}\tau_2^2 + \frac{J_1}{2}\tau_1\tau_2^2 +$$

$$v_0\tau_3 + a_0\tau_1\tau_3 + \frac{J_1}{2}\tau_1^2\tau_3 + a_0\tau_2\tau_3 + J_1\tau_1\tau_2\tau_3 + \frac{a_0}{2}\tau_3^2 + \frac{J_1}{2}\tau_1\tau_3^2 + \frac{J_3}{6}\tau_3^3 =$$

$$p_0 + v_0(\tau_1 + \tau_2 + \tau_3) + a_0(\tau_1\tau_2 + \tau_1\tau_3 + \tau_2\tau_3) +$$

$$\frac{J_1}{2}(\tau_1^2\tau_2 + \tau_1^2\tau_3 + \tau_2^2\tau_1 + \tau_1\tau_3^2) + \frac{a_0}{2}(\tau_1^2 + \tau_2^2 + \tau_3^2) + \frac{J_1}{6}\tau_1^3 + \frac{J_3}{6}\tau_3^3$$

The invention claimed is:

1. A computer-implemented method of determining a series of control signals for controlling an autonomous vehicle, the method comprising:

selecting a first or higher order derivative of acceleration with respect to time;

determining a parameterized stepwise kinematic function, the parameterized stepwise kinematic function being defined by a set of function parameters, and expressed as the set of function parameters comprising one or more timing parameters and one or more magnitude parameters defining a respective magnitude of said first or higher order derivative of acceleration with respect to time;

determining, by analytically integrating the parameterized stepwise kinematic function, a final acceleration, speed and position embodied as a set of parameterized closed form final acceleration, speed and position functions of the function parameters;

receiving from a maneuver planner a position target for a planned speed change maneuver;

optimizing the parameterized stepwise kinematic function in respect of the planned speed change maneuver by computing values of its function parameters in a constrained optimization process that optimizes a cost function defined over the set of function parameters, wherein the constrained optimization process imposes:

(i) a hard constraint that the final acceleration, speed and position corresponding to the parameterized stepwise kinematic function satisfy, respectively, an acceleration target, a speed target and the position target, given an initial speed and acceleration of the autonomous vehicle, wherein the hard constraint pertaining to the final acceleration, speed and position is embodied as the closed form final acceleration, speed and position functions of the function parameters, and is imposed without numerically integrating the parameterized stepwise kinematic function, and (ii) a hard constraint that a jerk magnitude does not exceed an upper limit;

using the parameterized stepwise kinematic function to determine the series of control signals configured to control the autonomous vehicle to implement the planned speed change maneuver; and controlling the autonomous vehicle to implement the planned speed change maneuver based on the series of control signals.

2. The method of claim 1, wherein the constrained optimization process hard constraints also imposes at least one acceleration and/or speed magnitude limit on the parameterized stepwise kinematic function.

3. The method of claim 1, wherein each the parameterized stepwise kinematic function is a jerk function, jerk being the first order derivative of acceleration with respect to time.

4. The method of claim 3, wherein the parameterized stepwise kinematic function exhibits a first interval of sustained jerk followed by a second interval of zero jerk, followed by a third interval of sustained jerk of opposite sign to the first interval, wherein the function parameters comprise:

one or more timing parameters defining respective durations of each of the first, second and third intervals, and one or more jerk magnitude parameters defining respective magnitudes of the sustained jerk in the first and third intervals.

5. The method of claim 4, wherein the set of function parameters comprises:

multiple timing parameters and/or multiple jerk magnitude parameters, which may be adapted to set different durations for the first, second and third time intervals and/or different jerk magnitudes in the first and third time intervals.

6. The method of claim 5, wherein the set of function parameters consists only of the three timing parameters and the two jerk magnitude parameters.

7. The method of claim 4, wherein the jerk remains constant and non-zero throughout the first and third time intervals.

8. The method of claim 1, wherein the parameterized stepwise kinematic function is a snap function, jerk being a rate of change of acceleration and snap being a second order derivative of acceleration with respect to time.

9. The method of claim 8, wherein the parameterized stepwise kinematic function is defined by a set of function parameters, over which the cost function is defined, and the parameterized stepwise kinematic function is optimised by computing values of the function parameters that substantially optimize the cost function subject to the set of hard constraints; wherein the parameterized stepwise snap function exhibits a first interval of sustained snap followed by a second interval of zero snap, followed by a third interval of sustained snap of opposite sign to the first interval, followed by a fourth interval of zero snap, followed by a fifth interval of sustained snap of same sign as the first interval, followed by a sixth interval of zero snap, followed by a seventh interval of sustained snap of opposite sign to the first interval, wherein the set of function parameters comprises:

one or more timing parameters defining respective durations of each of the seven intervals, and one or more snap magnitude parameters defining respective magnitudes of the snap in each of the first, third, fifth and seventh intervals.

10. The method of claim 1, wherein the cost function embodies a completion time objective, which encourages a reduction in at least one of:

overall time taken to reach the final acceleration, speed and position, or duration of each of multiple time intervals over which the parameterized stepwise kinematic function is defined.

11. The method of claim 10, wherein the cost function embodies at least one of:

a timing cost for each of the one or more intervals of the parameterized stepwise kinematic function claim 4 or 9, which encourages a reduction in the duration of that time interval, or a jerk magnitude objective, which encourages a reduction in jerk magnitude.

12. The method of claim 1, wherein the hard constraints also impose a jerk magnitude lower limit on the parameterized stepwise kinematic function.

13. The method of claim 2, wherein the at least one acceleration and/or speed magnitude limit comprises an upper acceleration and/or speed magnitude limit and a lower acceleration and/or speed magnitude limit.

14. The method of claim 1, wherein prior to instigating the speed change maneuver, a speed change initiation process is performed repeatedly, to determine a time at which to initiate the speed change maneuver, the time chosen so as to encourage the constrained optimization process to satisfy an optimal comfort condition to an extent possible.

15. The method of claim 14, wherein the speed change initiation process comprises:

determining a preliminary speed change trajectory, by computing a preliminary kinematic function with a fixed amount of jerk until a fixed acceleration limit is reached, wherein the speed change maneuver is initiated in response to the preliminary kinematic function satisfying a predetermined initiation condition.

16. The method of claim 1, wherein the hard constraints impose an upper limit on the time taken to reach the final position, speed and acceleration.

17. Non-transitory computer-readable media embodying instructions configured so as, when executed by one or more hardware processors, to cause the one or more hardware processors to perform operations for determining a series of control signals for controlling an autonomous vehicle, the operations comprising:

selecting a first or higher order derivative of acceleration with respect to time;

determining a parameterized stepwise kinematic function, the parameterized stepwise kinematic function being defined by a set of function parameters, and expressed as the set of function parameters comprising one or more timing parameters and one or more magnitude parameters defining a respective magnitude of said first or higher order derivative of acceleration with respect to time;

determining, by analytically integrating the parameterized stepwise kinematic function, a final acceleration, speed and position embodied as a set of parameterized closed form final acceleration, speed and position functions of the function parameters;

receiving from a maneuver planner a position target for a planned speed change maneuver;

optimizing the parameterized stepwise kinematic function in respect of the planned speed change maneuver by computing values of its function parameters in a constrained optimization process that optimizes a cost function defined over the set of function parameters, wherein the constrained optimization process imposes:

(i) a jerk magnitude upper limit on the computed kinematic function, and (ii) a hard constraint that the final acceleration, speed and position meet, respectively, an acceleration target, a speed target and the position target, wherein the constrained optimization process is performed in the domain of the kinematic function, with the final acceleration, speed and position are derived from the parameterized stepwise kinematic function, given an initial speed and acceleration of the autonomous vehicle, in order to apply the hard constraints, and wherein the constraint pertaining to the final acceleration, speed and position is embodied as the closed form final acceleration, speed and position functions of the function parameters, and is imposed without numerically integrating the kinematic function;

determining, based on the constrained optimization process, a series of control signals configured to control an autonomous vehicle to implement the planned speed change maneuver; and controlling the autonomous vehicle to implement the planned speed change maneuver based on the series of control signals.

18. The non-transitory computer-readable media of claim 17, wherein the form of the parameterized stepwise kinematic function is constrained such that corresponding final acceleration, velocity and distance functions are derived as closed form equations, having coefficients defined by said set of function parameters and current speed and acceleration of the autonomous vehicle, and a corresponding speed change distance is determined using the closed form equations.

19. A computer system comprising:

memory embodying instructions; and one or more hardware processors coupled to the memory and configured to execute the instructions, the instructions being configured so as, when executed by the one or more hardware processors, to cause the one or more hardware processors to perform operations comprising:

selecting a first or higher order derivative of acceleration with respect to time;

determining a parameterized stepwise kinematic function, the parameterized stepwise kinematic function being defined by a set of function parameters, and expressed as the set of function parameters comprising one or more timing parameters and one or more magnitude parameters defining a respective magnitude of said first or higher order derivative of acceleration with respect to time;

determining, by analytically integrating the parameterized stepwise kinematic function, a final acceleration, speed and position embodied as a set of parameterized closed form final acceleration, speed and position functions of the function parameters;

receiving a position target for a planned speed change maneuver; optimizing the parameterized stepwise kinematic function in respect of the planned speed change maneuver by computing values of its function parameters in a constrained optimization process that optimizes a cost function defined over the set of function parameters, wherein the constrained optimization process imposes:

(i) a hard constraint that the final acceleration, speed and position corresponding to the parameterized stepwise kinematic function satisfy, respectively, an acceleration target, a speed target and the position target, given an initial speed and acceleration of an autonomous vehicle, wherein the hard constraint pertaining to the final acceleration, speed and position is embodied as the closed form final acceleration, speed and position functions of the function parameters, and is imposed without numerically integrating the parameterized stepwise kinematic function, and (ii) a hard constraint that a jerk magnitude does not exceed an upper limit;

using the parameterized stepwise kinematic function to determine a series of control signals configured to control the autonomous vehicle to implement the planned speed change maneuver; and controlling the autonomous vehicle to implement the planned speed change maneuver based on the series of control signals.

\* \* \* \* \*